(12) United States Patent
Ray et al.

(10) Patent No.: US 10,948,214 B2
(45) Date of Patent: Mar. 16, 2021

(54) HVAC SYSTEM WITH ECONOMIZER SWITCHOVER CONTROL

(71) Applicant: Johnson Controls Technology Company, Auburn Hills, MI (US)

(72) Inventors: Soumyadeep Ray, Pune (IN); Milan Mitra, Milwaukee, WI (US); Sayan Chakraborty, Brookfield, WI (US); Anjani Kumari, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/405,294

(22) Filed: May 7, 2019

(65) Prior Publication Data

US 2019/0338979 A1 Nov. 7, 2019

Related U.S. Application Data

(60) Provisional application No. 62/668,017, filed on May 7, 2018.

(51) Int. Cl.
*F24F 11/30* (2018.01)
*F24F 11/67* (2018.01)
*F24F 110/22* (2018.01)
*F24F 110/12* (2018.01)

(52) U.S. Cl.
CPC ............. *F24F 11/67* (2018.01); *F24F 11/30* (2018.01); *F24F 2110/12* (2018.01); *F24F 2110/22* (2018.01)

(58) Field of Classification Search
CPC ........ F24F 11/67; F24F 11/30; F24F 2110/22; F24F 2110/12
See application file for complete search history.

(56) References Cited

U.S. PATENT DOCUMENTS

| | | |
|---|---|---|
| 4,362,026 A | 12/1982 | Miller |
| 4,452,620 A | 6/1984 | Dosmond |
| 4,506,514 A | 3/1985 | Lamar et al. |
| 4,570,448 A | 2/1986 | Smith |
| 5,890,372 A | 4/1999 | Belding et al. |
| 6,415,617 B1 * | 7/2002 | Seem ...................... F24F 3/044 62/186 |

(Continued)

*Primary Examiner* — Charles R Kasenge
(74) *Attorney, Agent, or Firm* — Foley & Lardner LLP

(57) ABSTRACT

An HVAC system for a building includes an airside economizer, a plurality of sensors, and a controller. The airside economizer includes a first air intake configured to receive return air from within a building, a second air intake configured to receive outdoor air from outside the building, and an air discharge configured to provide discharge air to the building. The controller is configured to identify a wet coil condition or a dry coil condition, calculate an enthalpy of the return air and an enthalpy of the outdoor air, select either a normal cooling mode or free cooling mode based on the calculated enthalpy of the return air, the calculated enthalpy of the outdoor air, and the identification of the wet coil condition or the dry coil condition, operate the airside economizer to provide the return air to the building as the discharge air in response to selecting the normal cooling mode, and operate the airside economizer provide the outdoor air to the building as the discharge air in response to selecting the free cooling mode.

20 Claims, 11 Drawing Sheets

(56) References Cited

U.S. PATENT DOCUMENTS

| | | |
|---|---|---|
| 7,580,775 B2 | 8/2009 | Kulyk et al. |
| 7,827,813 B2 * | 11/2010 | Seem ................ G05D 23/1931 |
| | | 62/186 |
| 7,894,946 B2 | 2/2011 | Kulyk et al. |
| 8,527,108 B2 | 9/2013 | Kulyk et al. |
| 8,527,109 B2 | 9/2013 | Kulyk et al. |
| 8,918,223 B2 | 12/2014 | Kulyk et al. |
| 9,110,647 B2 | 8/2015 | Kulyk et al. |
| 9,185,829 B2 | 11/2015 | Murayama et al. |
| 9,703,339 B2 | 7/2017 | Kulyk et al. |
| 9,982,903 B1 | 5/2018 | Ridder et al. |
| 10,139,877 B2 | 11/2018 | Kulyk et al. |
| 2007/0107450 A1 * | 5/2007 | Sasao ................... F24F 11/0008 |
| | | 62/185 |
| 2011/0036108 A1 * | 2/2011 | Seem ................... F24F 11/0001 |
| | | 62/89 |
| 2013/0013117 A1 * | 1/2013 | Desrochers ............... F24F 7/08 |
| | | 700/276 |
| 2014/0216707 A1 * | 8/2014 | Desrochers .............. F24F 11/62 |
| | | 165/250 |
| 2018/0209674 A1 | 7/2018 | Ridder et al. |
| 2018/0209675 A1 | 7/2018 | Ridder |

* cited by examiner

800 →

|  | HUMIDITY | TEMPERATURE | ENTHALPY |
|---|---|---|---|
| MAX | 68.2 | 74.6 | 31.6 |
| MIN | 57.8 | 70.6 | 27 |
| DIFF | 10.4 | 4.0 | 4.6 |

900 →

|  | SET1 (HOURS) | SET2 (HOURS) | SET3 (HOURS) | OVERALL |
|---|---|---|---|---|
| ECONOMIZER WITH FIXED SHUT OFF | 207 | 169 | 139 | 515 |
| FREE COOLING-AS PER MODIFIED ALOGORITHM | 234 | 239 | 143 | 616 |

HVAC SYSTEM WITH ECONOMIZER SWITCHOVER CONTROL

CROSS-REFERENCE TO RELATED PATENT APPLICATION

This application claims the benefit of and priority to U.S. Provisional Patent Application No. 62/668,017 filed May 7, 2018, the entire disclosure of which is incorporated by reference herein.

BACKGROUND

The present disclosure relates generally to heating, ventilation, or air conditioning (HVAC) systems for a building. The present disclosure relates more particularly to a HVAC system configured to optimize the operation of HVAC equipment used to provide free cooling to a building.

Free cooling is a technology which uses low temperature outdoor air to provide cooling for a system (e.g., a building). In traditional free cooling systems, free cooling is typically used when the dry bulb outdoor air temperature is less than a fixed threshold temperature. For example, the threshold temperature is often fixed at 68° F. An airside economizer may switchover from return air to outdoor air (i.e., switch into a free cooling mode) when the outdoor air temperature drops below the temperature threshold. A fixed setpoint is considered based on the assumption that return air will have fixed values for dry bulb temperature and relative humidity during the running hours of the airside economizer. However, a fixed economizer switchover point may cause the economizer to miss many potential free cooling hours when return air temperature and humidity are high, and because return air does not have fixed values. Thus, there is a need for a dynamic method for performing enthalpy based switchover between the free cooling mode and the mechanical cooling mode.

SUMMARY

One implementation of the present disclosure is a heating, ventilation, or air conditioning (HVAC) system for a building. The HVAC system includes an airside economizer, a plurality of sensors, and a controller. The airside economizer includes a first air intake configured to receive return air from within a building, a second air intake configured to receive outdoor air from outside the building, and an air discharge configured to provide discharge air to the building. The sensors are configured to measure temperature and humidity of the return air and temperature and humidity of the outdoor air. The controller is configured to calculate an enthalpy of the return air based on the measured temperature and humidity of the return air, calculate an enthalpy of the outdoor air based on the measured temperature and humidity of the outdoor air, select either a normal cooling mode or free cooling mode based on the calculated enthalpy of the return air and the calculated enthalpy of the outdoor air, and operate the airside economizer to provide the return air to the building as the discharge air in response to selecting the normal cooling mode or provide the outdoor air to the building as the discharge air in response to selecting the free cooling mode.

In some embodiments, the controller is configured to calculate a temperature dewpoint of the return air based on the measured temperature and humidity of the return air, compare the temperature dewpoint of the return air with a temperature setpoint for the discharge air, and identify the wet coil condition in response to the temperature dewpoint exceeding the temperature setpoint or the dry coil condition in response to the temperature dewpoint not exceeding the temperature setpoint.

In some embodiments, in response to identifying the wet coil condition, selecting either the normal cooling mode or the free cooling mode includes comparing the enthalpy of the return air with the enthalpy of the outdoor air, selecting the free cooling mode in response to the enthalpy of the return air exceeding the enthalpy of the outside air, and selecting the normal cooling mode in response to the enthalpy of the return air not exceeding the enthalpy of the outside air.

In some embodiments, in response to identifying the dry coil condition, selecting either the normal cooling mode or the free cooling mode includes predicting a first enthalpy of the discharge air under a first scenario in which the airside economizer is operated in the normal cooling mode, calculating a first difference between the first enthalpy of the discharge air and the enthalpy of the return air, predicting a second enthalpy of the discharge air under a second scenario in which the airside economizer is operated in the free cooling mode, calculating a second difference between the second enthalpy of the discharge air and the enthalpy of the outdoor air, and selecting either the normal cooling mode or the free cooling mode based on the first difference and the second difference.

In some embodiments, the controller is configured to select the free cooling mode if the first difference exceeds the second difference and select the normal cooling mode if the first difference does not exceed the second difference.

In some embodiments, the controller is configured to calculate a modified first difference by modifying the first difference to account for sensor error, compare the modified first difference to the second difference, and select either the normal cooling mode or the free cooling mode based on whether the second difference exceeds the modified first difference.

In some embodiments, the controller is configured to predict the first enthalpy based on a first humidity ratio in which the discharge air is equal to a humidity ratio of the return air and predict the second enthalpy based on a second humidity ratio in which the discharge air is equal to the humidity ratio of the outdoor air.

Another implementation of the present disclosure is a method for operating a heating, ventilation, or air conditioning (HVAC) system for a building, the method comprising receiving return air from within a building via a first air intake and outdoor air from outside the building via a second air intake. The method further comprises measuring temperature and humidity of the return air and the outdoor air via a plurality of sensors. The method further comprises identifying a wet coil condition or a dry coil condition. The method further comprises calculating an enthalpy of the return air based on the measured temperature and humidity of the return air. The method further comprises calculating an enthalpy of the outdoor air based on the measured temperature and humidity of the outdoor air. The method further comprises selecting either a normal cooling mode or free cooling mode based on the calculated enthalpy of the return air, the calculated enthalpy of the outdoor air, and the identification of the wet coil condition or the dry coil condition. The method finally comprises operating the airside economizer to provide the return air to the building as the discharge air in response to selecting the normal cooling mode or provide the outdoor air to the building as the discharge air in response to selecting the free cooling mode.

Another implementation of the present disclosure is a controller for a building heating, ventilation, or air conditioning (HVAC) system. The controller comprises one or more processors and one or more non-transitory computer-readable media storing instructions that, when executed by the one or more processors, cause the one or more processors to perform operations to identify a wet coil condition or a dry coil condition, calculate an enthalpy of the return air based on the measured temperature and humidity of the return air, calculate an enthalpy of the outdoor air based on the measured temperature and humidity of the outdoor air, select either a normal cooling mode or free cooling mode based on the calculated enthalpy of the return air and the calculated enthalpy of the outdoor air, and operate the HVAC equipment to provide the return air to the building as the discharge air in response to selecting the normal cooling mode or provide the outdoor air to the building as the discharge air in response to selecting the free cooling mode.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Some embodiments will become more fully understood from the following detailed description, taken in conjunction with the accompanying drawings, wherein like reference numerals refer to like elements.

DETAILED DESCRIPTION

Overview

Figure 1:
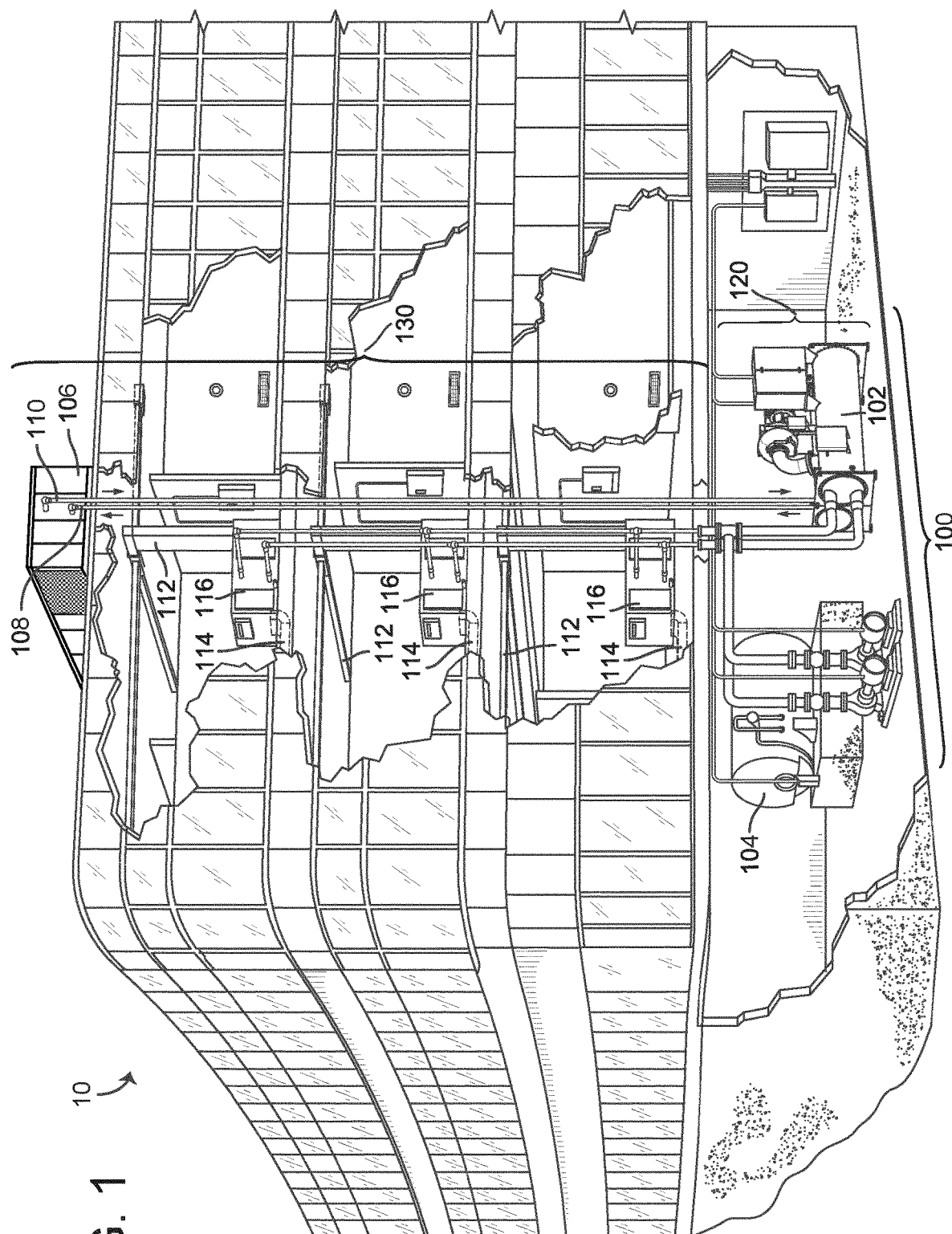
FIG. 1 is a drawing of a building equipped with a heating, ventilation, or air conditioning (HVAC) system, according to some embodiments.

Referring generally to the FIGURES, a heating, ventilation, or air conditioning (HVAC) system with predictive free cooling control and components thereof are shown, according to various exemplary embodiments. The HVAC system can operate in both a normal cooling mode and a free cooling mode. The HVAC system can transition between the normal cooling mode and free cooling mode to provide economically optimal cooling for a cooling load. In some embodiments, the HVAC system includes a controller which determine whether to operate in the normal cooling mode or the free cooling mode based on the enthalpies of outdoor air and return air.

In traditional free cooling systems, free cooling is typically used when the dry bulb outdoor air temperature is less than a fixed threshold temperature. For example, the threshold temperature is often fixed at 68° F. Free cooling is enabled/disabled based on a fixed enthalpy switchover setpoint, which is based on the assumption the temperature and humidity of the return air are fixed values throughout the operating hours of the system. However, the temperature and humidity of the return air provided to an air handling unit (AHU) or other economizer can vary significantly over time.

The systems and methods of the present disclosure take advantage of variations in return air temperature RA-T and return air humidity RA-H to dynamically switch between operating in a normal cooling mode (e.g., in which the return air is recycled) and a free cooling mode (e.g., in which outdoor air is provided to the building). The systems and methods of the present disclosure involve a two-step decision making approach for determining when to dynamically switch between the normal cooling mode and the free cooling mode. First, a comparison of return air dewpoint with discharge air temperature setpoint is used to determine if the system is in a wet coil condition or a dry coil condition. Based on the coil condition, it is determined which airstream (return or outdoor) should be used for passage through the coil and conditioned to discharge air temperature setpoint. Thus, the switch between normal cooling mode and free cooling mode is no longer based on a fixed predefined setpoint, but on the conditions of the return airstream, outdoor airstream, and cooling coil at any given point of time. This results in greater economizer hours as the free cooling mode is more frequently used and will consequently result in greater energy conservation due to reduced chiller runtime.

Under wet coil conditions (i.e. when the return air dewpoint is greater than the discharge air temperature setpoint), whichever air stream (i.e., outdoor air (OA) or return air (RA)) has the lower enthalpy is selected for cooling and passed through the cooling coil. In conditions of dry coil (i.e. when the return air dewpoint is greater than discharge air temperature setpoint), the cooling mode selection works differently.

As is true in the case of dry coil, the humidity ratio (HR) of the air leaving the coil is the same as that of the air entering the cooling coil. A free cooling control system and method described herein determines the humidity ratio of the discharge air (and in turn relative humidity) by considering the humidity ratio of both the outdoor air and return air. From the discharge air relative humidity obtained, the discharge air enthalpy can be calculated with respect to the humidity ratio of the air stream considered. Accordingly, the enthalpy difference between the discharge air and the outdoor air can be compared with the enthalpy difference between discharge air and return air. For whichever air stream the enthalpy difference is lesser, that particular air stream is selected for passing through the cooling coil. Additional features and advantages of the free cooling control system and method are described in detail below.

Building HVAC System

Figure 2:
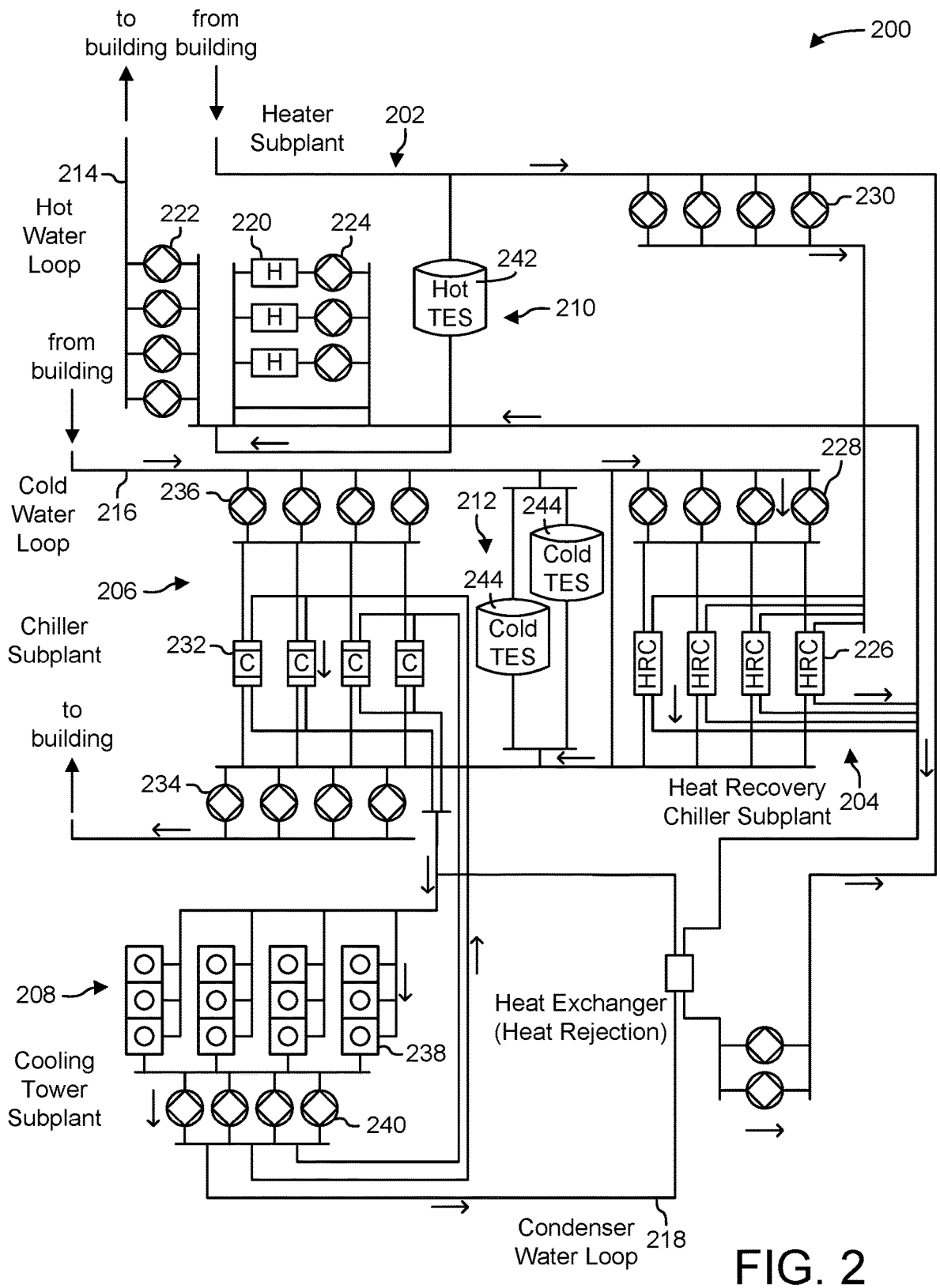
FIG. 2 is a drawing of a waterside system which can be used in combination with the HVAC system of FIG. 1, according to some embodiments.
Figure 3:
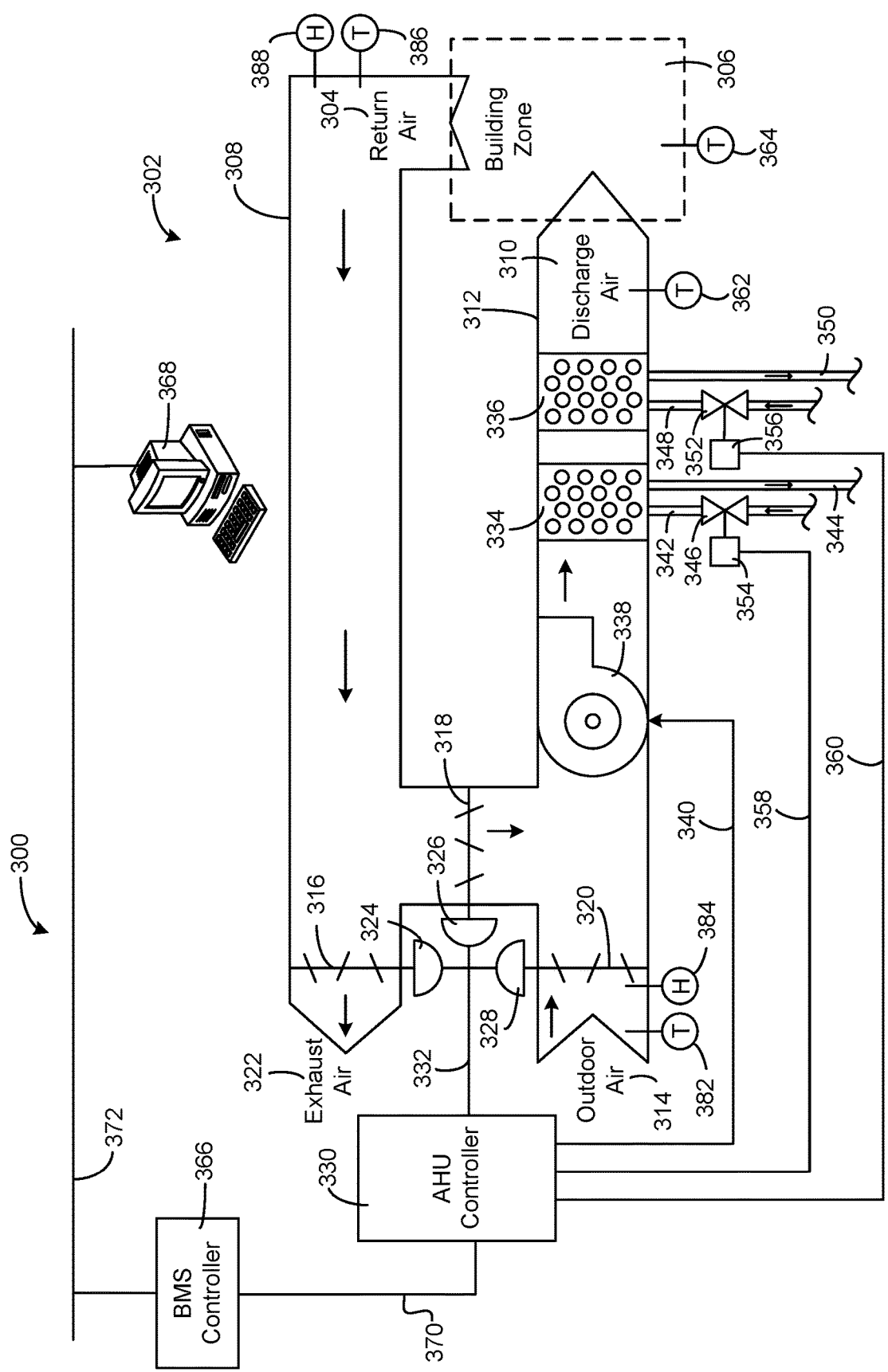
FIG. 3 is a drawing of an airside system which can be used in combination with the HVAC system of FIG. 1, according to some embodiments.

Referring now to FIGS. 1-3, an example building HVAC system in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outdoor air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the discharge airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the discharge airflow provided to individual zones of building 10. In other embodiments, airside system 130 delivers the discharge airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the discharge airflow. AHU 106 may receive input from sensors located within AHU 106 and/or within the building zone and may adjust the flowrate, temperature, or other attributes of the discharge airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flowrate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flowrate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flowrate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flowrate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outdoor air) to provide free cooling for the water in cold water loop 216. In some embodiments, waterside system 200 switches between free cooling with cooling tower subplant 208 and mechanical cooling with chiller subplant 208 based on the current temperature of the outdoor air and/or the predicted future temperature of the outdoor air. An example of a free cooling system which can be used in waterside system 200 is described in greater detail with reference to FIG. 6.

Hot TES subplant 210 is shown to include a hot TES tank 242 configured to store the hot water for later use. Hot TES subplant 210 may also include one or more pumps or valves configured to control the flowrate of the hot water into or out of hot TES tank 242. Cold TES subplant 212 is shown to include cold TES tanks 244 configured to store the cold water for later use. Cold TES subplant 212 may also include one or more pumps or valves configured to control the flowrate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outdoor air and return air used by the air handling unit for heating or cooling. For example, AHU 302 may receive return air 304 from building zone 306 via return air duct 308 and may deliver discharge air 310 to building zone 306 via discharge air duct 312. In some embodiments, AHU 302 is a rooftop unit located on the roof of building 10 (e.g., AHU 106 as shown in FIG. 1) or otherwise positioned to receive both return air 304 and outdoor air 314. AHU 302 can be configured to operate exhaust air damper 316, mixing damper 318, and outdoor air damper 320 to control an amount of outdoor air 314 and return air 304 that combine to form discharge air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outdoor air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within discharge air duct 312. Fan 338 can be configured to force discharge air 310 through cooling coil 334 and/or heating coil 336 and provide discharge air 310 to building zone 306. AHU controller 330 may communicate with fan 338 via communications link 340 to control a flowrate of discharge air 310. In some embodiments, AHU controller 330 controls an amount of heating or cooling applied to discharge air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flowrate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to discharge air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flowrate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to discharge air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the discharge air temperature from a temperature sensor 362 positioned in discharge air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to discharge air 310 (e.g., to achieve a setpoint temperature for discharge air 310 or to maintain the temperature of discharge air 310 within a setpoint temperature range). The positions of valves 346 and 352 affect the amount of heating or cooling provided to discharge air 310 by cooling coil 334 or heating coil 336 and may correlate with the amount of energy consumed to achieve a desired discharge air temperature. AHU 330 may control the temperature of discharge air 310 and/or building zone 306 by activating or deactivating coils 334-336, adjusting a speed of fan 338, or a combination of both.

In some embodiments, AHU controller 330 determines whether to operate in a free cooling mode or a normal cooling mode. In the free cooling mode, AHU controller 330 may close mixing damper 318 and open outdoor air damper 320 such that outdoor air 314 is provided to building zone 306. In the normal cooling mode, AHU controller 330 may open mixing damper 318 and close outdoor air damper 320 such that return air 304 is recycled and provided to building zone 306. Cooling coil 334 can be used to provide additional cooling for the air passing through discharge air duct 312 regardless of the cooling mode used. In some embodiments, AHU controller determines whether to operate in the free cooling mode or the normal cooling mode based on measurements of return air 304 and/or outdoor air 314. For example, AHU controller 330 may collect measurements of the temperature and humidity of return air 304 using temperature sensor 386 and humidity sensor 388. AHU controller 330 may collect measurements of the temperature and humidity of outdoor air 314 using temperature sensor 382 and humidity sensor 384. The control logic used by AHU controller 330 to determine whether to operate in the free cooling mode or the normal cooling mode is described in greater detail with reference to FIGS. 4-5B.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Free Cooling Control System

Figure 4:
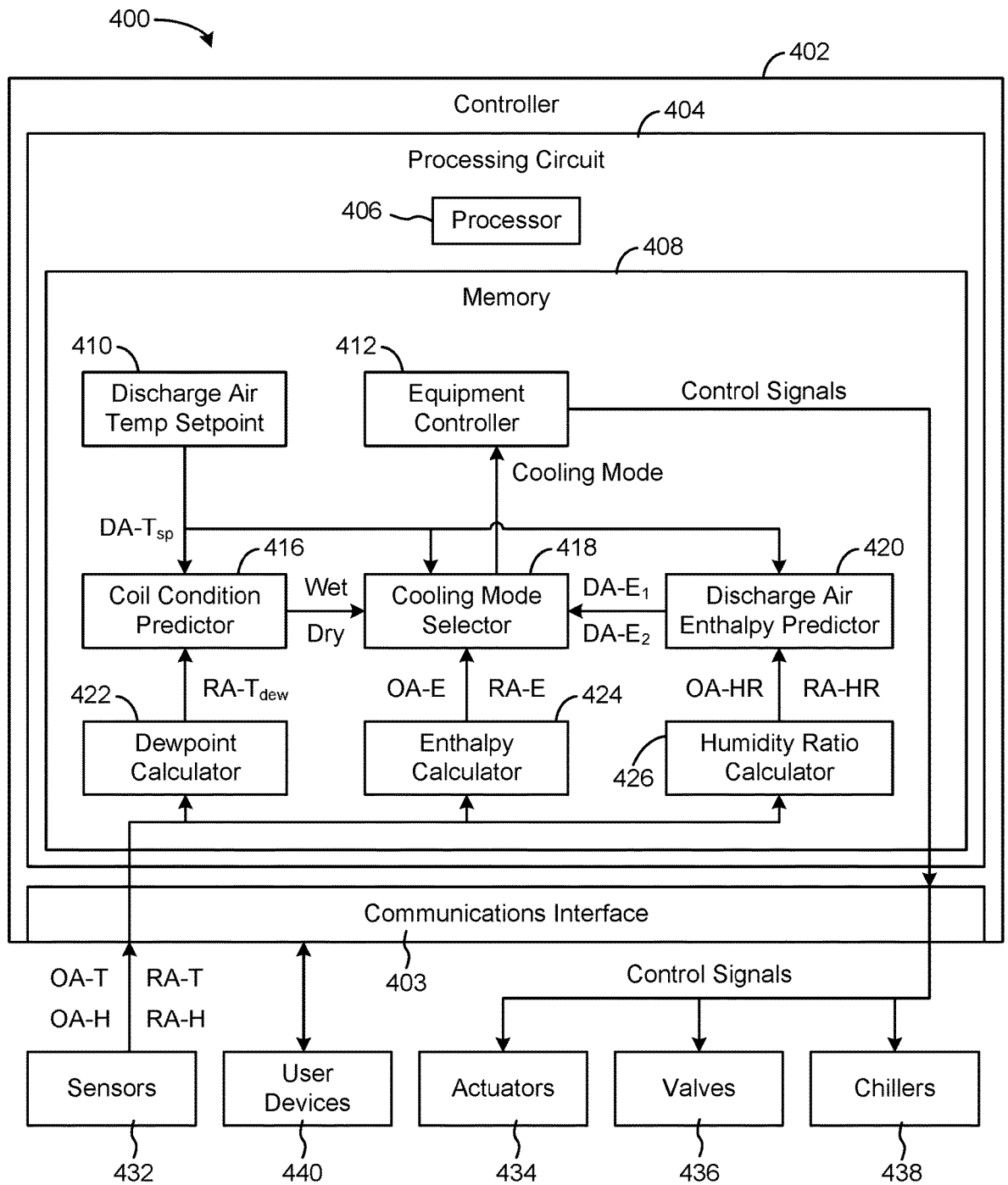
FIG. 4 is a block diagram of a free cooling control system which can be implemented in any of the systems of FIGS. 1-3, according to some embodiments.

Referring now to FIG. 4, a block diagram of a free cooling control system 400 is shown, according to an exemplary embodiment. Control system 400 can be implemented as part of HVAC system 100, waterside system 200, airside system 300, and/or any other type of system that uses free cooling. In some embodiments, control system 400 can be used in the free cooling system(s) described in U.S. patent application Ser. No. 15/411,878 filed Jan. 20, 2017, U.S. patent application Ser. No. 15/422,422 filed Feb. 1, 2017, and/or U.S. patent application Ser. No. 15/925,466 filed Mar. 19, 2018, and may include some or all of the features described in these patent applications. The entire disclosure of each of these patent applications is incorporated by reference herein.

Control system 400 is shown to include a controller 402, sensors 432, actuators 434, valves 436, and chillers 438. In brief overview, controller 402 may use measurements from sensors 432 (e.g., sensors 362, 364, 382, 384, 386, and/or 388) to determine an operating state for free cooling control system 400. For example, controller 402 can determine whether to operate in a free cooling mode or a normal cooling mode based on temperature and humidity measurements of outdoor air 314 and/or return air 304. Controller 402 can generate and provide control signals for actuators 434 (e.g., actuators 324-328, actuators 354-356, etc.), valves 436 (e.g., valves 346 and 352), and chillers 438 (e.g., chillers 232, heat recovery chillers 226, etc.), which causes control system 400 to transition between the free cooling mode and the normal cooling mode. Actuators 434, valves 436, and chillers 438 operate to affect an environmental condition in a building (e.g., temperature, humidity, airflow, etc.), which can be measured by sensors 432 and provided as a feedback to controller 402.

Controller 402 can be any type of controller in a HVAC system or BMS. In some embodiments, controller 402 is a zone controller configured to monitor and control a building zone. For example, controller 402 can be a zone temperature controller, a zone humidity controller, a VAV zone controller, a changeover bypass (COBP) zone controller, or any other type of controller for a building zone. In other embodiments, controller 402 is a system controller or subsystem controller. For example, controller 402 can be a BMS controller (e.g., BMS controller 366), a central plant controller, a subplant controller, a supervisory controller for a HVAC system or any other type of building subsystem. In some embodiments, controller 402 is a field controller or device controller configured to monitor and control the performance of a set of HVAC devices or other building equipment. For example, controller 402 can be an AHU controller (e.g., AHU controller 330), a thermostat controller, a rooftop unit controller, a chiller controller, a damper controller, or any other type of controller in a HVAC system or BMS.

In some embodiments, controller 402 is a hybrid controller which combines the functionality of a discrete control system and a closed loop control system. A discrete control system can be described using a finite state diagram (FSD) and implemented in a finite state machine (FSM). In a discrete control system, a controller evaluates state transition conditions (e.g., using feedback from the controlled system) and transitions between various operating states when one or more of the state transition conditions are satisfied. Each of the operating states in a discrete control system can have a corresponding set of control outputs. In some embodiments, the control outputs in a discrete control system remain constant as long as the controller remains in the same operating state and change only when the controller transitions into a new operating state.

A closed loop control system can be implemented using any of a variety of control techniques (e.g., feedback control, feedforward control, extremum seeking control, proportional-integral control, proportional-integral-derivative control, model predictive control, etc.). In a closed loop control system, a controller modulates a control output (i.e., a manipulated variable) provided to the controlled system over a range of values in order to achieve a desired effect. For example, controller 402 can modulate the control output (e.g., control signals for actuators 434, valves 436, and/or chillers 438) to drive a monitored variable to a setpoint. In some embodiments, controller 402 uses feedback from the controlled system (e.g., measurements from sensors 432) to determine an error between the setpoint and the monitored variable. Controller 402 can variably increase or decrease the control output within the range of values in order to drive the error to zero.

Still referring to FIG. 4, control system 400 is shown to include sensors 432, actuators 434, valves 436, chillers 438, and user devices 440. Sensors 432 can include any of a variety of sensors configured to measure a variable state or condition in a building. For example, sensors 432 can include temperature sensors, humidity sensors, airflow sensors, lighting sensors, pressure sensors, voltage sensors, or any other type of sensor. Sensors 432 can be distributed throughout a building and configured to measure various environmental conditions at different locations in the building. For example, one of sensors 432 can be located in a first zone of the building and configured to measure the temperature of the first zone, whereas another of sensors 432 can be located in a second zone of the building and configured to measure the temperature of the second zone. Similarly, sensors 432 can be distributed throughout a HVAC system and configured to measure conditions at different locations in the HVAC system. For example, one of sensors 432 can be a discharge air temperature sensor (e.g., temperature sensor 362) configured to measure the temperature of discharge air 310 provided to building zone 306 from an AHU, whereas other sensors 432 can include return air temperature sensor 386 and return air humidity sensor 388 configured to measure the temperature and humidity of return air 304 from building zone 306 to the AHU.

In some embodiments, sensors 432 include outdoor air sensors configured to measure the temperature, pressure, humidity, or other attributes of the air outside the building. For example, sensors 432 may include outdoor air temperature sensor 382 and outdoor air humidity sensor 384. Sensors 432 can provide measurements as inputs to controller 402 via communications interface 403. In some embodiments, sensors 432 provide a feedback signal to controller 402 indicating the value of a variable of interest in the controlled system (e.g., building zone temperature, building zone humidity, system power consumption, etc.) or outside the controlled system (e.g., outdoor air temperature). Controller 402 can use the measurements from sensors 432 to evaluate state transition conditions and/or to perform closed loop control operations within various operating states.

User devices 440 can include any of a variety of user-operable devices configured to facilitate user interaction with controller 402 and/or control system 400. For example, user devices 440 can include a computer workstation, a desktop computer, a laptop computer, a tablet, a smartphone, a PDA, or any other type of mobile or non-mobile device. User devices 440 can include user interface elements (e.g., electronic display screens, touchscreen displays, keyboards, speakers, buttons, dials, etc.) configured to receive input from a user and provide output to a user. User devices 440 can interact with controller 402 via communications interface 403 to monitor system operation and provide input to controller 402. For example, user devices 440 can allow a user to provide controller 402 with setpoints, operating parameters, manual values for measured variables, operating commands, manual state transition commands, and/or other types of user input. Controller 402 can use the input from user devices 440 to evaluate state transition conditions and/or to perform closed loop control operations within various operating states.

Actuators 434, valves 436, and chillers 438 can include any of the systems or devices of HVAC system 100, waterside system 200, or airside system 300, as described with reference to FIGS. 1-3. In some embodiments, control system 400 includes other types of equipment in addition to actuators 434, valves 436, and chillers 438. For example, control system 400 can include one or more chillers, boilers, AHUs, economizers, controllers, actuators, fans, pumps, electronic valves, and/or other types of equipment which can be operated by controller 402 to affect a variable state or condition (e.g., temperature, humidity, airflow, lighting, etc.) in or around building 10. The equipment of control system 400 can provide operating data to controller 402 and can receive control signals from controller 402. In some embodiments, the equipment operate according to the control signals to affect one or more of the variables measured by sensors 432.

Still referring to FIG. 4, controller 402 is shown to include a communications interface 403 and a processing circuit 404. Communications interface 403 can include wired or wireless interfaces (e.g., jacks, antennas, transmitters, receivers, transceivers, wire terminals, etc.) for conducting data communications with various systems, devices, or networks. For example, communications interface 403 can include an Ethernet card and port for sending and receiving data via an Ethernet-based communications network and/or a Wi-Fi transceiver for communicating via a wireless communications network. Communications interface 403 can be configured to communicate via local area networks or wide area networks (e.g., the Internet, a building WAN, etc.) and may use a variety of communications protocols (e.g., BACnet, IP, LON, etc.).

Communications interface 403 can be a network interface configured to facilitate electronic data communications between controller 402 and various external systems or devices (e.g., sensors 432, user devices 440, actuators 434, valves 436, chillers 438, etc.). For example, controller 402 can receive setpoints and operating parameters from a supervisory controller (e.g., BMS controller 366, etc.) via communications interface 403. Controller 402 can receive measurements from sensors 432 via communications interface 403. Controller 402 can use communications interface 403 to send control signals to actuators 434, valves 436, and chillers 438. In some embodiments, controller 402 provides user interfaces and other information to user devices 440 via communications interface 403.

Processing circuit 404 is shown to include a processor 406 and memory 408. Processor 406 can be a general purpose or specific purpose processor, an application specific integrated circuit (ASIC), one or more field programmable gate arrays (FPGAs), a group of processing components, or other suitable processing components. Processor 406 can be configured to execute computer code or instructions stored in memory 408 or received from other computer readable media (e.g., CDROM, network storage, a remote server, etc.).

Memory 408 can include one or more devices (e.g., memory units, memory devices, storage devices, etc.) for storing data and/or computer code for completing and/or facilitating the various processes described in the present disclosure. Memory 408 can include random access memory (RAM), read-only memory (ROM), hard drive storage, temporary storage, non-volatile memory, flash memory, optical memory, or any other suitable memory for storing software objects and/or computer instructions. Memory 408 can include database components, object code components, script components, or any other type of information structure for supporting the various activities and information structures described in the present disclosure. Memory 408 can be communicably connected to processor 406 via processing circuit 404 and can include computer code for executing (e.g., by processor 406) one or more processes described herein.

Memory 408 is shown to include several functional components 416-426 that enable controller 402 to determine whether to operate in a free cooling mode or a normal cooling mode. In some embodiments, controller 402 determines whether to operate in the free cooling mode or the normal cooling mode based on measurements of return air 304 and/or outdoor air 314 collected using sensors 432. For example, controller 402 may receive measurements of the outdoor air temperature OA-T, the outdoor air humidity OA-H, the return air temperature RA-T, and the return air humidity RA-H from sensors 432. The measurements can be provided to dewpoint calculator 422, enthalpy calculator 424, humidity ratio calculator 426, and/or other components of controller 402.

Dewpoint calculator 422 can be configured to determine the dewpoint RA-$T_{dew}$ of return air 304 based on the temperature RA-T and humidity RA-H of return air 304. Coil condition predictor 416 can compare the dewpoint RA-$T_{dew}$ of return air 304 with the discharge air temperature setpoint 410 DA-Tsp to determine whether dehumidification of discharge air 310 will occur when discharge air 310 passes over cooling coil 334. Dehumidification of discharge air 310 may occur when the dewpoint RA-$T_{dew}$ of return air 304 is greater than the discharge air temperature setpoint DA-$T_{sp}$, which causes moisture from discharge air 310 to condense on cooling coil 334. Accordingly, if the dewpoint RA-$T_{dew}$ of return air 304 is greater than the discharge air temperature setpoint DA-$T_{sp}$, coil condition predictor 416 may determine that dehumidification will occur and therefore cooling coil 334 has a wet condition. Conversely, if the dewpoint RA-$T_{dew}$ of return air 304 is less than or equal to the discharge air temperature setpoint DA-$T_{sp}$, coil condition predictor 416 may determine that dehumidification will not occur and therefore cooling coil 334 has a dry condition. Coil condition predictor 416 can provide an indication of whether cooling coil 334 has a wet condition or a dry condition to cooling mode selector 418.

If cooling coil 334 has a wet condition, cooling mode selector 418 may select either the free cooling mode or the normal cooling mode based on which of outdoor air 314 and return air 304 has the lesser enthalpy. Enthalpy calculator 424 may calculate the enthalpy OA-E of outdoor air 314 and the enthalpy RA-E of return air 304 based on the measurements received from sensors 432 and may provide the calculated enthalpies OA-E and RA-E to cooling mode selector 418. The enthalpies OA-E and RA-E are calculated using current readings of the sensors 432, rather than using any fixed or predetermined setpoints. Cooling mode selector 418 may compare the enthalpies OA-E and RA-E with each other to determine which is lowest. If the outdoor air enthalpy OA-E is less than the return air enthalpy RA-E, cooling mode selector 418 may select the free cooling mode (i.e., free cooling=true). However, if the outdoor air enthalpy OA-E is not less than the return air enthalpy RA-E, cooling mode selector 418 may select the normal cooling mode (i.e., free cooling=false). Again, the enthalpy comparison is based on calculations using current measurements received from the sensors 432, and does not utilize predetermined setpoints.

If cooling coil 334 has a dry condition, cooling mode selector 418 may select either the free cooling mode or the normal cooling mode based on the predicted enthalpy difference between discharge air 310 and outdoor air 314 and the predicted enthalpy difference between discharge air 310 and return air 304. Enthalpy calculator 424 may calculate the enthalpy OA-E of outdoor air 314 and the enthalpy RA-E of return air 304 based on the measurements received from sensors 432 and may provide the calculated enthalpies OA-E and RA-E to cooling mode selector 418. Similarly, humidity ratio calculator 426 may calculate the humidity ratio OA-HR of outdoor air 314 and the humidity ratio RA-HR of return air 304 based on the measurements received from sensors 432 and may provide the calculated humidity ratios OA-HR and RA-HR to discharge air enthalpy predictor 420.

Discharge air enthalpy predictor 420 may predict the enthalpy of discharge air 310 under two potential scenarios: (1) free cooling is not used and (2) free cooling is used. Under the first scenario in which free cooling is not used, return air 304 may be cooled by cooling coil 334 and provided back to building zone 306 as discharge air 310. Because cooling coil 334 has a dry condition (i.e., dehumidification of return air 304 does not occur), the humidity ratio DA-$HR_1$ of discharge air 310 is equal to the humidity ratio RA-HR of return air 304 (i.e., DA-$HR_1$=RA-HR) under the first scenario. Accordingly, discharge air enthalpy predictor 420 may set a first humidity ratio DA-$HR_1$ of discharge air 310 is equal to the humidity ratio RA-HR of return air 304. Discharge air enthalpy predictor 420 may then use the first humidity ratio DA-$HR_1$ of discharge air 310 in combination with the discharge air temperature setpoint DA-$T_{sp}$ to predict a first enthalpy DA-$E_1$ of discharge air 310 under the first scenario (i.e., DA-$E_1$=f(DA-$HR_1$, DA-$T_{sp}$)). Discharge air enthalpy predictor 420 may provide the first predicted enthalpy DA-$E_1$ of discharge air 310 to cooling mode selector 418.

Under the second scenario in which free cooling is used, outdoor air 314 may be cooled by cooling coil 334 and provided to building zone 306 as discharge air 310. Because cooling coil 334 has a dry condition (i.e., dehumidification of outdoor air 314 does not occur), the humidity ratio DA-$HR_2$ of discharge air 310 is equal to the humidity ratio RA-HR of outdoor air 314 (i.e., DA-$HR_2$=OA-HR) under the second scenario. Accordingly, discharge air enthalpy predictor 420 may set a second humidity ratio DA-$HR_2$ of discharge air 310 is equal to the humidity ratio RA-OA of outdoor air 314. Discharge air enthalpy predictor 420 may then use the second humidity ratio DA-$HR_2$ of discharge air 310 in combination with the discharge air temperature setpoint DA-$T_{sp}$ to predict a second enthalpy DA-$E_2$ of discharge air 310 under the second scenario (i.e., DA-$E_2$=f(DA-$HR_2$, DA-$T_{sp}$). Discharge air enthalpy predictor 420 may provide the second predicted enthalpy DA-$E_2$ of discharge air 310 to cooling mode selector 418.

Cooling mode selector 418 may calculate first difference X between the return air enthalpy RA-E and the first predicted discharge air enthalpy DA-$E_1$ (i.e., X=RA-E−DA-$E_1$). In some embodiments, cooling mode selector 418 multiplies the first difference X by a correction factor CF to compensate for a sensor error of the relative humidity sensor 388 used to measure the humidity of return air 304 (i.e., Y=CF*X). The correction factor CF may be defined as CF=1−ε/100, where ε is the percentage error of relative humidity sensor 388 (e.g., ε=3%). In this example, the correction factor CF would have a value of 0.97 (i.e., CF=1−(3/100)=0.97) such that Y=0.97*X. Similarly, cooling mode selector 418 may calculate second difference Z between the outdoor air enthalpy OA-E and the second predicted discharge air enthalpy DA-$E_2$ (i.e., Z=OA-E−DA-$E_2$).

The value of Y indicates the amount of energy needed to be removed from return air 304 in order to cool return air 304 to the discharge air temperature setpoint DA-$T_{sp}$ under the first scenario (i.e., free cooling is not used), whereas the value of Z indicates the amount of energy needed to be removed from outdoor air 314 in order to cool outdoor air 314 to the discharge air temperature setpoint DA-$T_{sp}$ under the second scenario (i.e., free cooling is used). Cooling mode selector 418 may compare the values of Y and Z to determine which is lower.

If the value of Z is less than the value of Y (i.e., Z<Y), this implies that the amount of energy needed to be removed from outdoor air 314 in order to cool outdoor air 314 to discharge air conditions is less than the amount of energy needed to be removed from return air 304 to cool return air 304 to discharge air conditions. Accordingly, cooling mode selector 418 may select the free cooling mode in response to a determination that Z<Y (i.e., free cooling=true). However, if the value of Z is not less than the value of Y (i.e., Z≥Y), this implies that the amount of energy needed to be removed from outdoor air 314 in order to cool outdoor air 314 to discharge air conditions is greater than or equal to the amount of energy needed to be removed from return air 304 to cool return air 304 to discharge air conditions. Accordingly, cooling mode selector 418 may select the normal cooling mode in response to a determination that Z≥Y (i.e., free cooling=false). Cooling mode selector 418 may provide an indication of the selected cooling mode to equipment controller 412.

Equipment controller 412 can be configured to operate actuators 434, valves 436, and/or chillers 438 by generating and providing control signals to actuators 434, valves 436, and/or chillers 438 based on the selected cooling mode. In the free cooling mode, controller 402 may operate actuators 434 to close mixing damper 318 and open outdoor air damper 320 such that outdoor air 314 is provided to building zone 306. In the normal cooling mode, controller 402 may operate actuators 434 to open mixing damper 318 and close outdoor air damper 320 such that return air 304 is recycled and provided to building zone 306. Equipment controller 412 may operate cooling coil 334 to provide additional cooling for the air passing through discharge air duct 312 regardless of the cooling mode selected.

Free Cooling Control Process

Figure 5A:
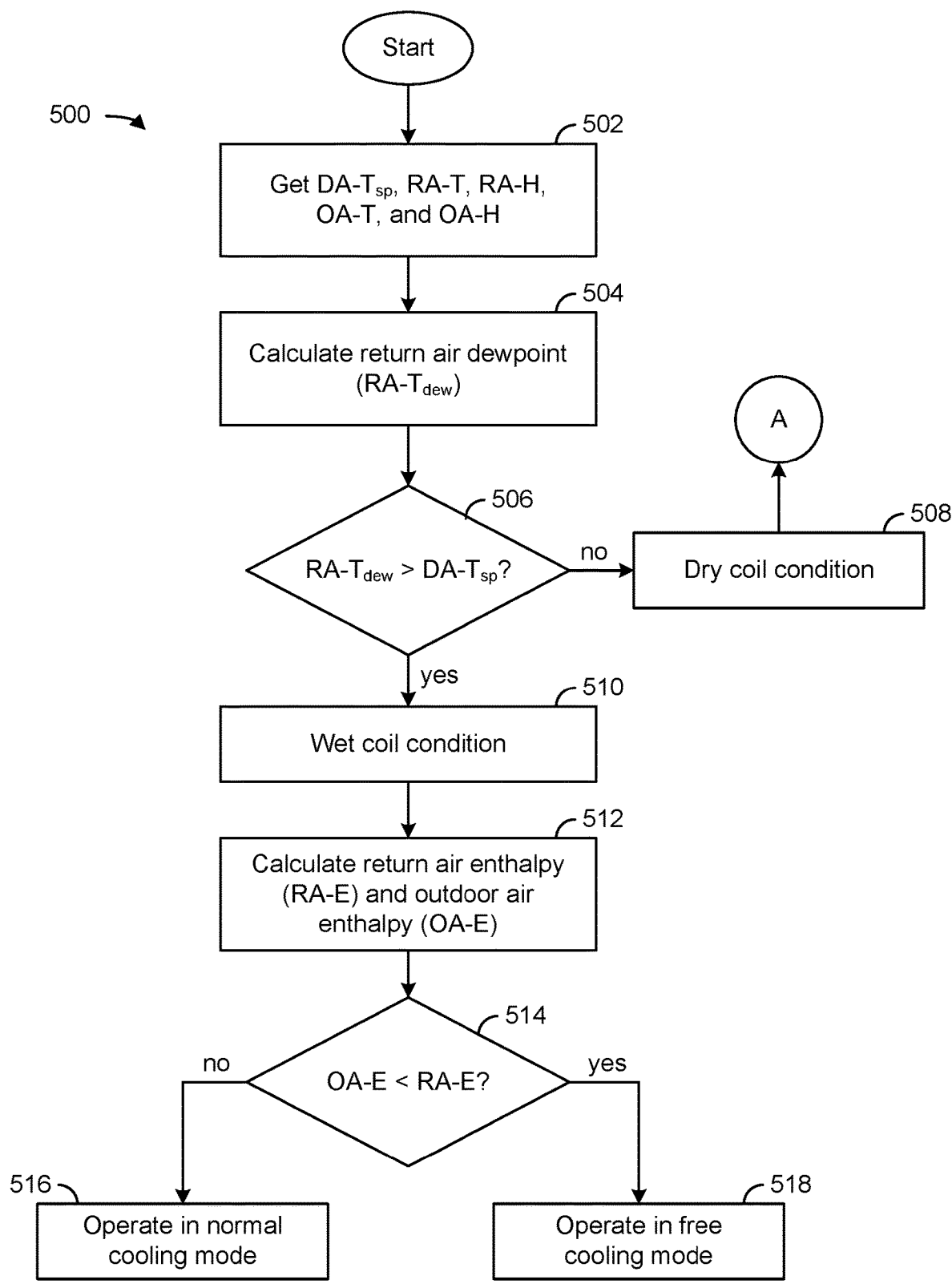
FIGS. 5A and 5B are flowcharts of a free cooling control process which can be performed by the free cooling control system of FIG. 4, according to some embodiments.
Figure 5B:
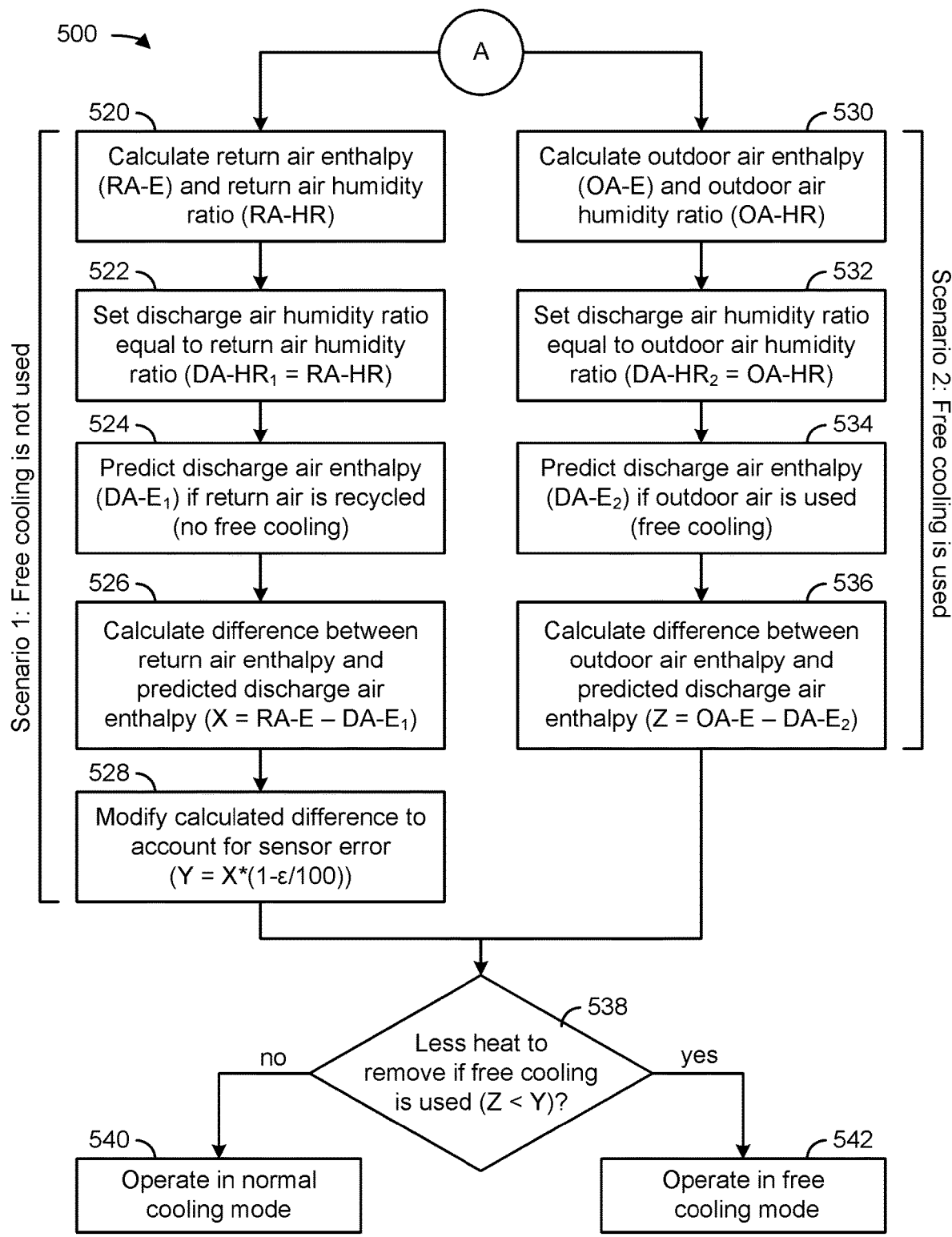

Referring now to FIGS. 5A-5B, a flowchart of a process 500 for operating free cooling control system 400 is shown, according to an exemplary embodiment. Process 500 can be performed by one or more components of free cooling control system 400, as described with reference to FIG. 4.

Process 500 is shown to include getting values of the discharge air temperature setpoint DA-$T_{sp}$, the return air temperature RA-T, the return air humidity RA-H, the outdoor air temperature OA-T, and the outdoor air humidity OA-H (step 502). The values of these variables can be measured by sensors 432 and/or retrieved from memory 408. The return air temperature RA-T and the return air humidity RA-H can be used by dewpoint calculator 422 to calculate the return air dewpoint RA-$T_{dew}$ (step 504).

Process 500 is shown to include comparing the return air dewpoint RA-$T_{dew}$ with the discharge air temperature setpoint DA-$T_{sp}$ (step 506). If the return air dewpoint RA-$T_{dew}$ is greater than the discharge air temperature setpoint DA-$T_{sp}$ (i.e., the result of step 506 is yes), coil condition predictor 416 may predict a wet coil condition (step 510) and proceed to step 512. However, if the return air dewpoint RA-$T_{dew}$ is not greater than the discharge air temperature setpoint DA-$T_{sp}$ (i.e., the result of step 506 is no), coil condition predictor 416 may predict a dry coil condition (step 508) and proceed to steps 520-542, shown in FIG. 5B.

In step 512, enthalpy calculator 424 may then be used to calculate the return air enthalpy RA-E and the outdoor air enthalpy OA-E. Cooling mode selector 418 may then compare the outdoor air enthalpy OA-E with the return air enthalpy OA-E (step 514). If the outdoor air enthalpy OA-E is less than the return air enthalpy RA-E (i.e., the result of step 514 is yes), cooling mode selector 418 may select the free cooling mode and control system 400 may be operated in the free cooling mode (step 518). In the free cooling mode, controller 402 may operate actuators 434 to close mixing damper 318 and open outdoor air damper 320 such that outdoor air 314 is provided to building zone 306.

However, if the outdoor air enthalpy OA-E is not less than the return air enthalpy RA-E (i.e., the result of step 514 is no), cooling mode selector 418 may select the normal cooling mode and control system 400 may be operated in the normal cooling mode (step 516). In the normal cooling mode, controller 402 may operate actuators 434 to open mixing damper 318 and close outdoor air damper 320 such that return air 304 is recycled and provided to building zone 306. Equipment controller 412 may operate cooling coil 334 to provide additional cooling for the air passing through discharge air duct 312 regardless of the cooling mode selected.

Referring particularly to FIG. 5B, in response to detecting the dry coil condition in step 508, process 500 may proceed to steps 520-542. Steps 520-536 can be performed to predict the enthalpy of discharge air 310 under two potential scenarios: (1) free cooling is not used and (2) free cooling is used. Steps 520-528 cover the first scenario, whereas steps 530-536 cover the second scenario. In various embodiments, steps 520-528 may be performed sequentially with steps 530-536 (i.e., before or after steps 530-536) or concurrently with steps 530-536.

Process 500 is shown to include calculating the return air enthalpy RA-E and the return air humidity ratio RA-HR (step 520). Under the first scenario in which free cooling is not used, return air 304 may be cooled by cooling coil 334 and provided back to building zone 306 as discharge air 310. Because cooling coil 334 has a dry condition (i.e., dehumidification of return air 304 does not occur), the humidity ratio DA-$HR_1$ of discharge air 310 is equal to the humidity ratio RA-HR of return air 304 (i.e., DA-$HR_1$=RA-HR) under the first scenario. Accordingly, process 500 is shown to include setting a first humidity ratio DA-$HR_1$ of discharge air 310 equal to the humidity ratio RA-HR of return air 304 (step 522).

Process 500 is shown to include using the first humidity ratio DA-$HR_1$ of discharge air 310 in combination with the discharge air temperature setpoint DA-$T_{sp}$ to predict a first enthalpy DA-$E_1$ of discharge air 310 under the first scenario (i.e., DA-$E_1$=f(DA-$HR_1$, DA-$T_{sp}$)) in which return air is recycled and free cooling is not used (step 524). Process 500 is shown to include calculating a first difference X between the return air enthalpy RA-E and the first predicted discharge air enthalpy DA-$E_1$ (i.e., X=RA-E−DA-$E_1$) (step 526).

In some embodiments, process 500 includes modifying the first difference X to account for sensor error (step 528). Step 528 may include multiplying the first difference X by a correction factor CF to compensate for a sensor error of the relative humidity sensor 388 used to measure the humidity of return air 304 (i.e., Y=CF*X). The correction factor CF may be defined as CF=1−ε/100, where ε is the percentage error of relative humidity sensor 388 (e.g., ε=3%). In this example, the correction factor CF would have a value of 0.97 (i.e., CF=1−(3/100)=0.97) such that Y=0.97*X.

Process 500 is shown to include calculating the outdoor air enthalpy OA-E and the outdoor air humidity ratio OA-HR (step 530). Under the second scenario in which free cooling is used, outdoor air 314 may be cooled by cooling coil 334 and provided to building zone 306 as discharge air 310. Because cooling coil 334 has a dry condition (i.e., dehumidification of outdoor air 314 does not occur), the humidity ratio DA-$HR_2$ of discharge air 310 is equal to the humidity ratio RA-HR of outdoor air 314 (i.e., DA-$HR_2$=OA-HR) under the second scenario. Accordingly, process 500 is shown to include setting a second humidity ratio DA-$HR_2$ of discharge air 310 equal to the humidity ratio RA-OA of outdoor air 314 (step 532).

Process 500 is shown to include using the second humidity ratio DA-$HR_2$ of discharge air 310 in combination with the discharge air temperature setpoint DA-$T_{sp}$ to predict a second enthalpy DA-$E_2$ of discharge air 310 under the second scenario (i.e., DA-$E_2$=f(DA-$HR_2$, DA-$T_{sp}$)) in which free cooling is used (step 534). Process 500 may include calculating a second difference Z between the outdoor air enthalpy OA-E and the second predicted discharge air enthalpy DA-$E_2$ (i.e., Z=OA-E−DA-$E_2$) (step 536).

Process 500 is shown to include determining whether less heat needs to be removed if free cooling is used (step 538). The value of Y indicates the amount of energy needed to be removed from return air 304 in order to cool return air 304 to the discharge air temperature setpoint DA-$T_{sp}$ under the first scenario (i.e., free cooling is not used), whereas the value of Z indicates the amount of energy needed to be removed from outdoor air 314 in order to cool outdoor air 314 to the discharge air temperature setpoint DA-$T_{sp}$ under the second scenario (i.e., free cooling is used). Accordingly, step 538 may include comparing the values of Y and Z to determine which is lower.

If the value of Z is less than the value of Y (i.e., Z<Y), this implies that the amount of energy needed to be removed from outdoor air 314 in order to cool outdoor air 314 to discharge air conditions is less than the amount of energy needed to be removed from return air 304 to cool return air 304 to discharge air conditions. Accordingly, process 500 may include selecting the free cooling mode and operating system 400 in the free cooling mode (step 542) in response to a determination that Z<Y (i.e., free cooling=true). In the free cooling mode, controller 402 may operate actuators 434 to close mixing damper 318 and open outdoor air damper 320 such that outdoor air 314 is provided to building zone 306.

However, if the value of Z is not less than the value of Y (i.e., Z≥Y), this implies that the amount of energy needed to be removed from outdoor air 314 in order to cool outdoor air 314 to discharge air conditions is greater than or equal to the amount of energy needed to be removed from return air 304 to cool return air 304 to discharge air conditions. Accordingly, process 500 may include selecting the normal cooling mode and operating system 400 in the normal cooling mode (step 540) in response to a determination that Z≥Y (i.e., free cooling=false). In the normal cooling mode, controller 402 may operate actuators 434 to open mixing damper 318 and close outdoor air damper 320 such that return air 304 is recycled and provided to building zone 306. Equipment controller 412 may operate cooling coil 334 to provide additional cooling for the air passing through discharge air duct 312 regardless of the cooling mode selected.

Graphs and Test Results

Referring now to FIGS. 6-16, several graphs and tables illustrating the improvements resulting from the systems and methods of the present disclosure are shown, according to an exemplary embodiment.

Figure 6:
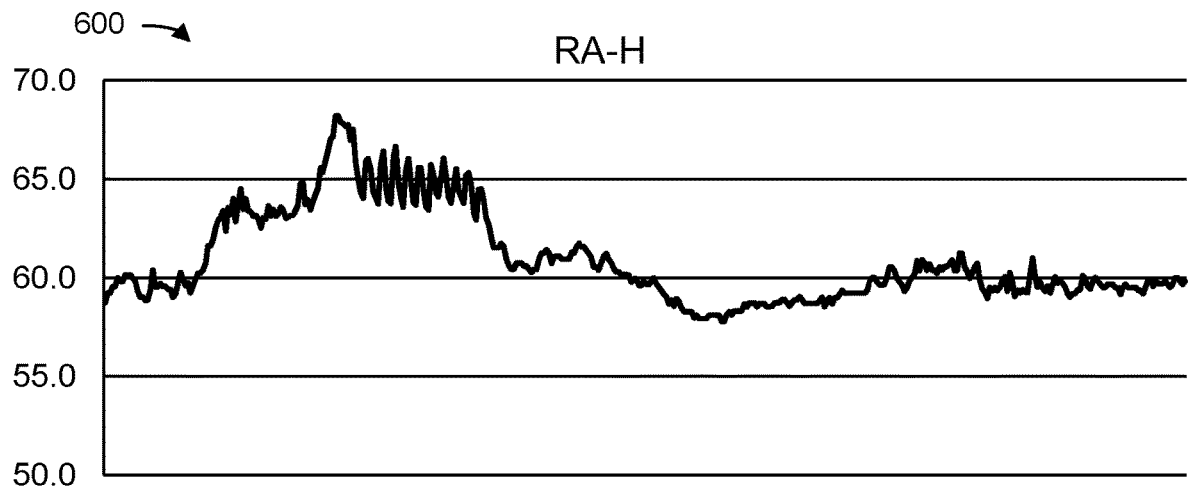
FIG. 6 is a graph illustrating the measured humidity RA-H of the return air provided to an AHU over a time period of one month, according to some embodiments.
Figure 7:
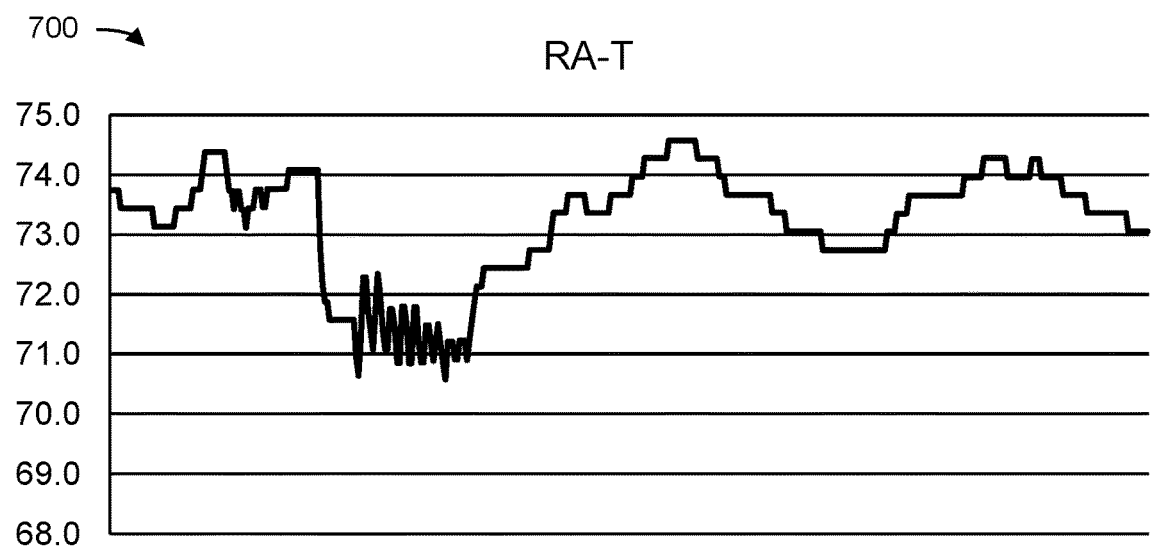
FIG. 7 is a graph illustrating the measured temperature RA-T of the return air provided to an AHU over a time period of one month, according to some embodiments.
Figures 8, 9, 10:
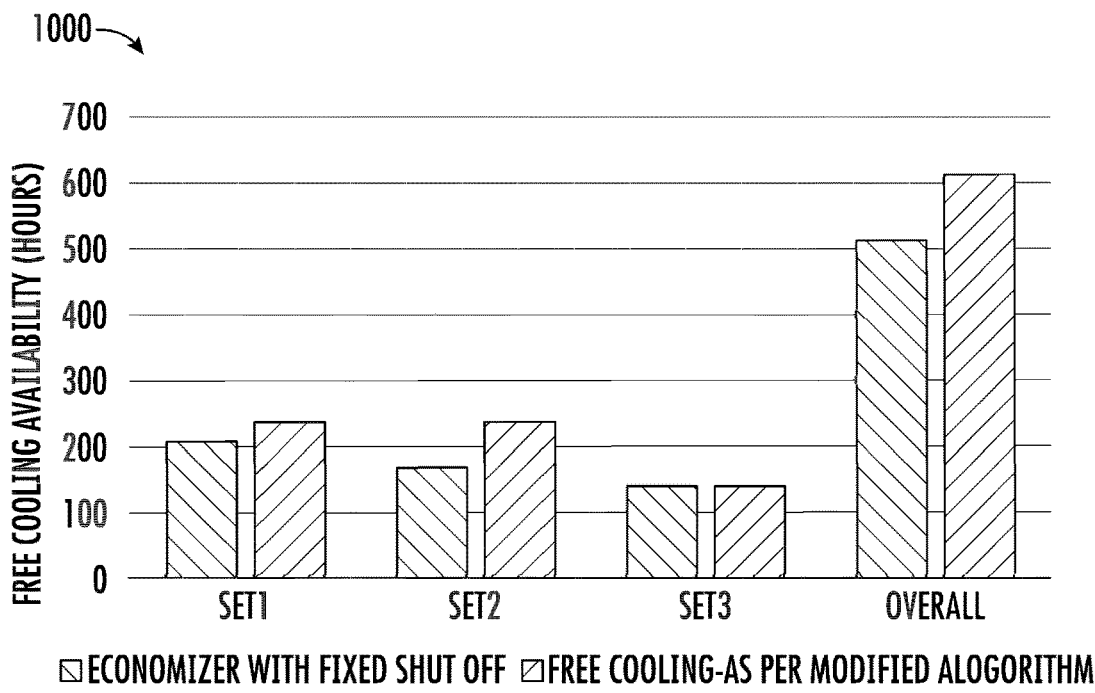
FIG. 8 is a table indicating the maximum and minimum temperature, humidity, and corresponding enthalpy values shown in the graphs of FIGS. 6-7, according to some embodiments.
FIG. 9 is a table illustrating a difference between the number of hours for which free cooling is available under a traditional free cooling system and the number of hours for which free cooling is available in the free cooling control system of FIG. 4, resulting from the varying temperature and humidity values illustrated in FIGS. 11-12, according to some embodiments.
FIG. 10 is a graph illustrating the data shown in table graphically, according to some embodiments.

FIGS. 6-7 are graphs 600 and 700 illustrating the measured humidity RA-H (FIG. 6) and measured temperature RA-T (FIG. 7) of the return air provided to an AHU over a given time period (e.g., one month). It is evident from graphs 600 and 700 that both the return air temperature RA-T and the return air humidity RA-H vary over time. FIG. 8 is a table 800 illustrating the minimum and maximum values of RA-T and RA-H shown in FIGS. 6-7, as well as the corresponding enthalpy values. Table 800 also indicates the differences between the maximum and minimum temperature values, humidity values, and enthalpy values.

FIG. 9 is a table 900 illustrating a difference between the number of hours for which free cooling is available under a traditional free cooling system and the number of hours for which free cooling is available in control system 400. Each set of hours in table 900 represents a time period of ten days. In the traditional free cooling system (i.e., an economizer with a fixed shut off point), free cooling is available for 207 hours during set 1 (e.g., the first ten days of a month), 169 hours during set 2 (e.g., the second ten days of the month), and 139 hours during set 3 (e.g., the third ten days of the month) for a total of 515 free cooling hours. For the same month, free cooling control system 400 allows free cooling to be used for 234 hours during set 1, 239 hours during set 2, and 143 hours during set 3 for a total of 616 free cooling hours. FIG. 10 is a graph 1000 illustrating the data shown in table 900 graphically.

Figure 11:
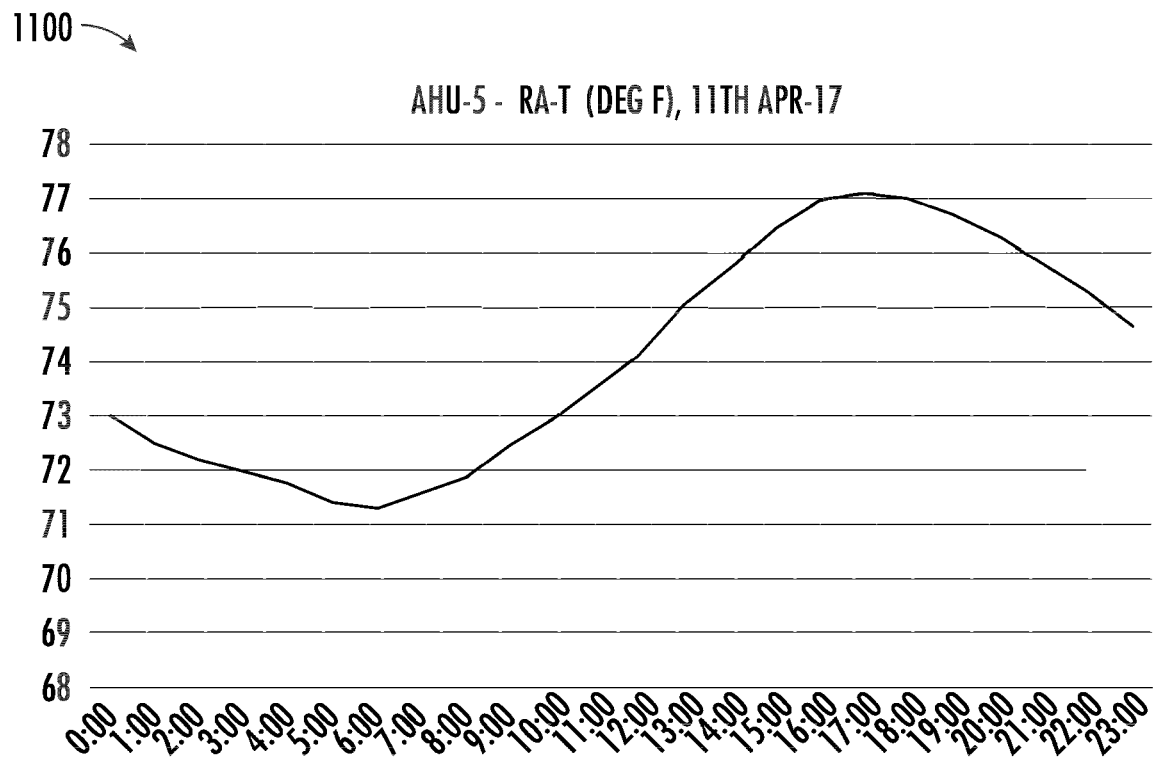
FIG. 11 is a graph illustrating the measured temperature RA-T of the return air provided to an AHU over a time period of one day in April 2017, according to some embodiments.
Figure 12:
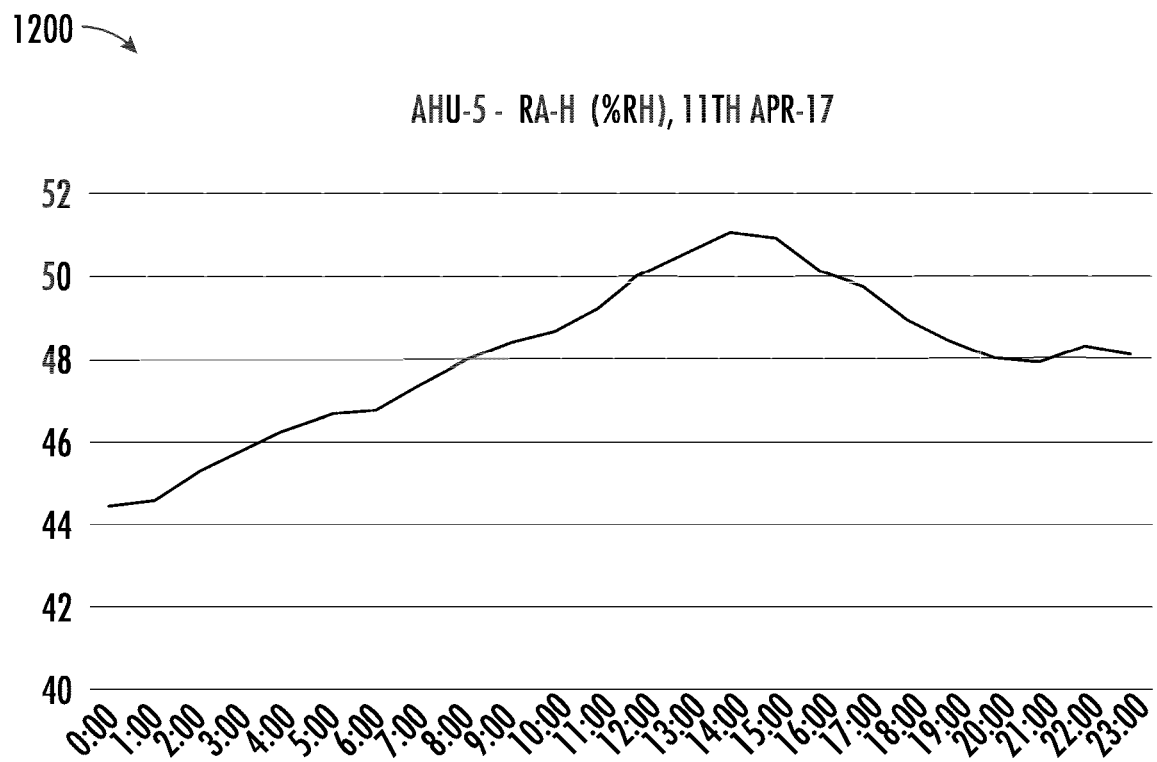
FIG. 12 is a graph illustrating the measured humidity RA-H of the return air provided to an AHU over a time period of one day in April 2017, according to some embodiments.

FIGS. 11-12 are graphs 1100 and 1200 illustrating the measured temperature RA-T (FIG. 11) and measured humidity RA-H (FIG. 12) of the return air provided to an AHU over a time period of one day in April 2017. It is evident from graphs 1100 and 1200 that both the return air temperature RA-T and the return air humidity RA-H vary throughout the day. At various times throughout the day, free cooling may be viable or non-viable based on the enthalpy of the return air, even if the outdoor air temperature does not change.

Figure 13:
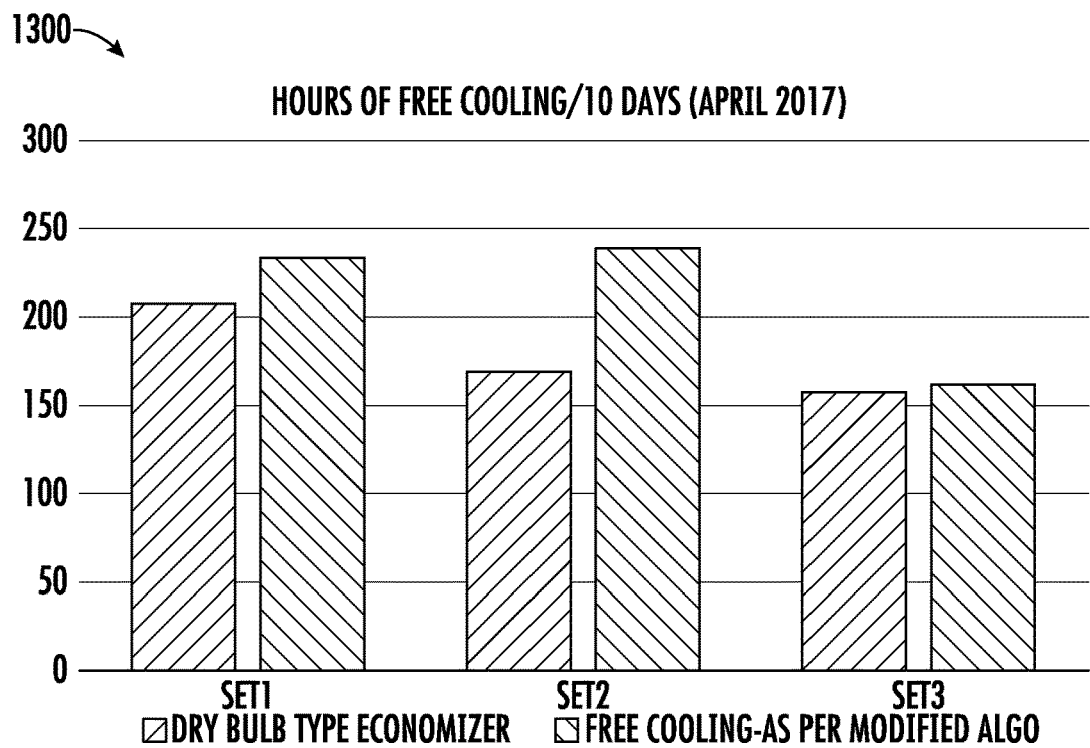
FIG. 13 is a graph illustrating a difference between the number of hours for which free cooling is available under a traditional free cooling system and the number of hours for which free cooling is available in the free cooling control system of FIG. 4, resulting from the varying temperature and humidity values illustrated in FIGS. 11-12, according to some embodiments.

FIG. 13 is a graph 1300 illustrating a difference between the number of hours for which free cooling is available under a traditional free cooling system and the number of hours for which free cooling is available in control system 400. Each set of hours represents a time period of ten days in April 2017. In the traditional free cooling system (i.e., an economizer with a fixed shut off point), free cooling is available for approximately 210 hours during set 1 (e.g., the first ten days of the month), approximately 170 hours during set 2 (e.g., the second ten days of the month), and approximately 160 hours during set 3 (e.g., the third ten days of the month). For the same month, free cooling control system 400 allows free cooling to be used for approximately 240 hours during set 1, approximately 245 hours during set 2, and approximately 165 hours during set 3.

Figure 14:
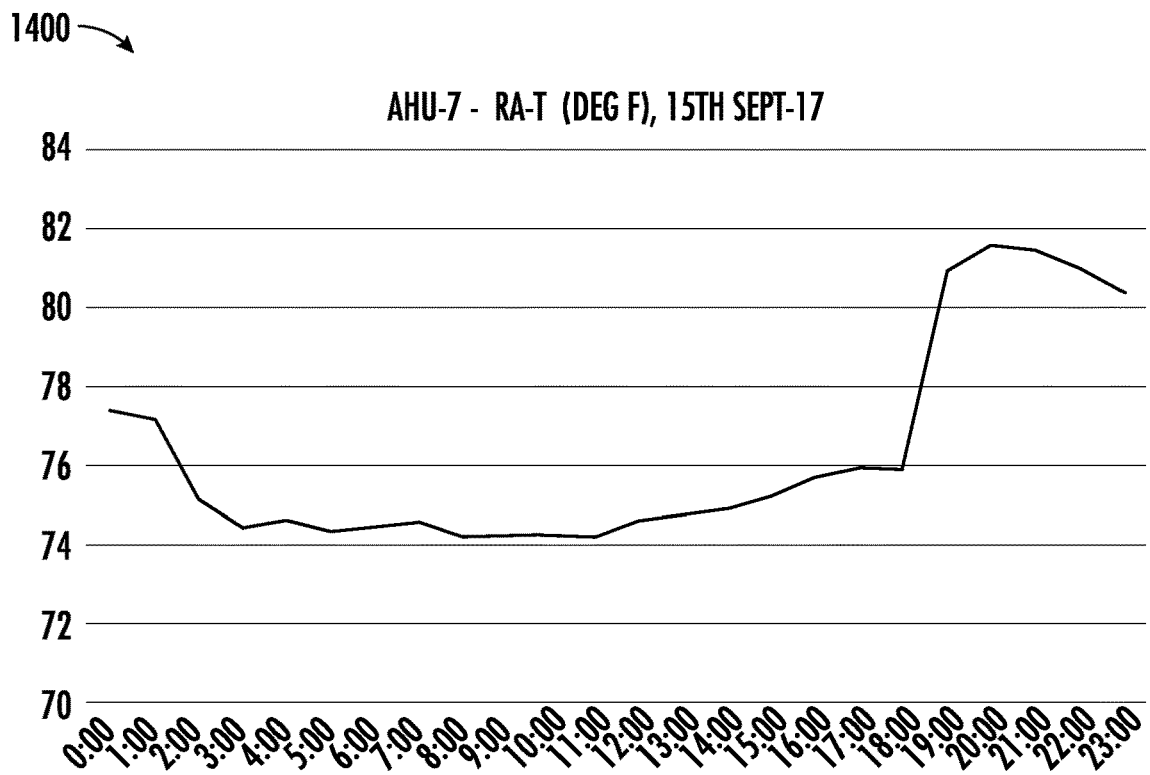
FIG. 14 is a graph illustrating the measured temperature RA-T of the return air provided to an AHU over a time period of one day in September 2017, according to some embodiments.
Figure 15:
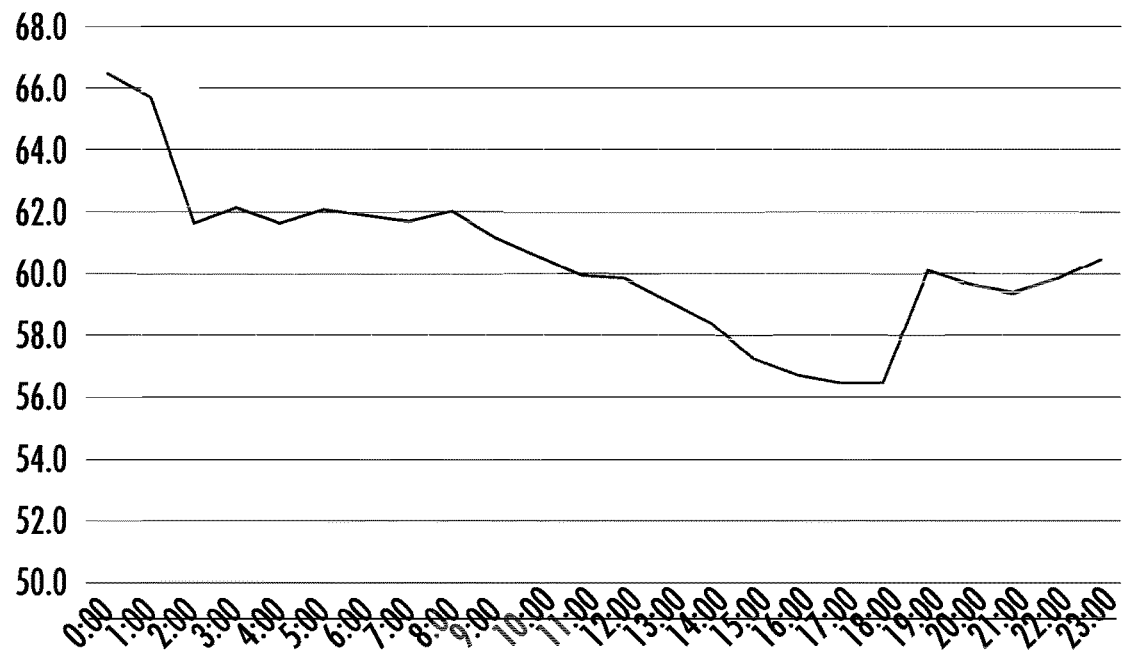
FIG. 15 is a graph illustrating the measured humidity RA-H of the return air provided to an AHU over a time period of one day in September 2017, according to some embodiments.

FIGS. 14-15 are graphs 1400 and 1500 illustrating the measured temperature RA-T (FIG. 14) and measured humidity RA-H (FIG. 15) of the return air provided to an AHU over a time period of one day in September 2017. It is evident from graphs 1400 and 1500 that both the return air temperature RA-T and the return air humidity RA-H vary throughout the day. At various times throughout the day, free cooling may be viable or non-viable based on the enthalpy of the return air, even if the outdoor air temperature does not change.

Figure 16:
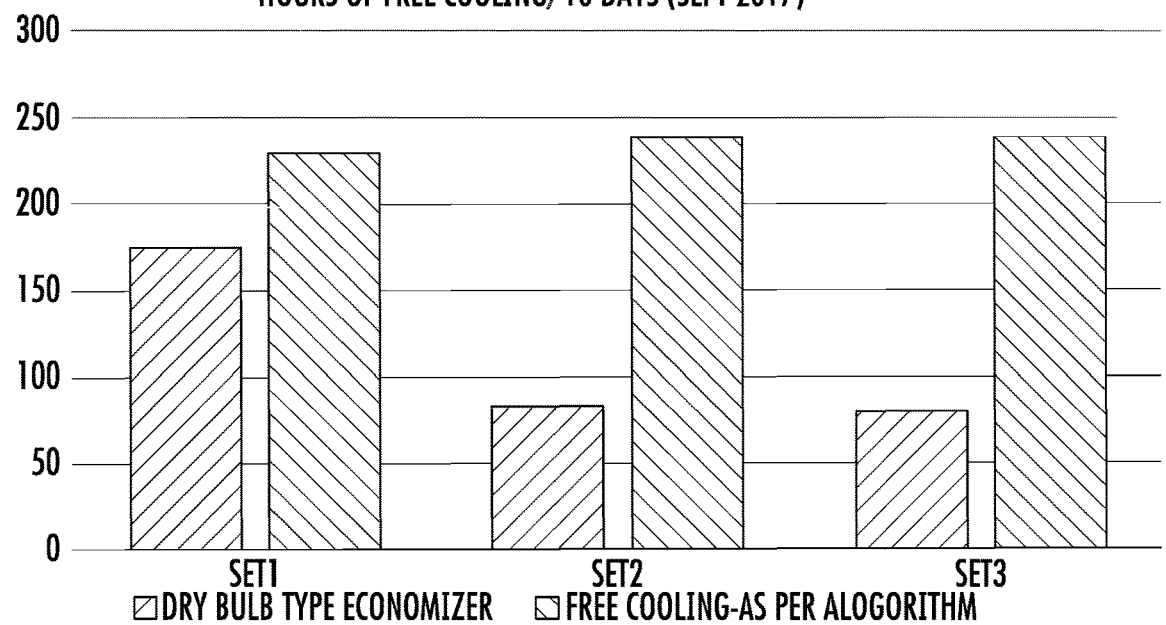
FIG. 16 is a graph illustrating a difference between the number of hours for which free cooling is available under a traditional free cooling system and the number of hours for which free cooling is available in the free cooling control system of FIG. 4, resulting from the varying temperature and humidity values illustrated in FIGS. 14-15, according to some embodiments.

FIG. 16 is a graph 1600 illustrating a difference between the number of hours for which free cooling is available under a traditional free cooling system and the number of hours for which free cooling is available in control system 400. Each set of hours represents a time period of ten days in September 2017. In the traditional free cooling system (i.e., an economizer with a fixed shut off point), free cooling is available for approximately 175 hours during set 1 (e.g., the first ten days of the month), approximately 80 hours during set 2 (e.g., the second ten days of the month), and approximately 80 hours during set 3 (e.g., the third ten days of the month). For the same month, free cooling control system 400 allows free cooling to be used for approximately 240 hours during set 1, approximately 245 hours during set 2, and approximately 245 hours during set 3.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, or air conditioning (HVAC) system for a building, the HVAC system comprising:
    an airside economizer comprising a first air intake configured to receive return air from within a building, a second air intake configured to receive outdoor air from outside the building, and an air discharge configured to provide discharge air to the building;
    a plurality of sensors configured to measure temperature and humidity of the return air and temperature and humidity of the outdoor air; and
    a controller configured to:
    identify a wet coil condition by calculating a temperature dewpoint of the return air based on the measured temperature and humidity of the return air;
    comparing the temperature dewpoint of the return air with a temperature setpoint for the discharge air;
        identifying the wet coil condition in response to the temperature dewpoint of the return air exceeding the temperature setpoint;
        calculate an enthalpy of the return air based on the measured temperature and humidity of the return air;
        calculate an enthalpy of the outdoor air based on the measured temperature and humidity of the outdoor air;
        select either a normal cooling mode or free cooling mode based on the calculated enthalpy of the return air, the calculated enthalpy of the outdoor air, and whether a coil condition is the wet coil condition;
        operate the airside economizer to provide the return air to the building as the discharge air in response to selecting the normal cooling mode; and
        operate the airside economizer to provide the outdoor air to the building as the discharge air in response to selecting the free cooling mode.

2. The HVAC system of claim 1, further comprising: identifying a dry coil condition by:
    identifying the dry coil condition in response to the temperature dewpoint not exceeding the temperature setpoint; and
    wherein the normal cooling mode or free cooling mode based on the calculated enthalpy of the return air, the calculated enthalpy of the outdoor air, and whether the coil condition is the wet coil condition or the dry coil condition.

3. The HVAC system of claim 2, wherein in response to identifying the wet coil condition, selecting either the normal cooling mode or the free cooling mode comprises:
    comparing the enthalpy of the return air with the enthalpy of the outdoor air;
    selecting the free cooling mode in response to the enthalpy of the return air exceeding the enthalpy of the outdoor air; and
    selecting the normal cooling mode in response to the enthalpy of the return air not exceeding the enthalpy of the outdoor air.

4. The HVAC system of claim 2, wherein in response to identifying the dry coil condition, selecting either the normal cooling mode or the free cooling mode comprises:
    predicting a first enthalpy of the discharge air under a first scenario in which the airside economizer is operated in the normal cooling mode;
    calculating a first difference between the first enthalpy of the discharge air and the enthalpy of the return air;
    predicting a second enthalpy of the discharge air under a second scenario in which the airside economizer is operated in the free cooling mode;
    calculating a second difference between the second enthalpy of the discharge air and the enthalpy of the outdoor air; and
    selecting either the normal cooling mode or the free cooling mode based on the first difference and the second difference.

5. The HVAC system of claim 4, wherein the controller is configured to:
    select the free cooling mode if the first difference exceeds the second difference; and
    select the normal cooling mode if the first difference does not exceed the second difference.

6. The HVAC system of claim 4, wherein the controller is configured to:
    calculate a modified first difference by modifying the first difference to account for sensor error;
    compare the modified first difference to the second difference; and
    select either the normal cooling mode or the free cooling mode based on whether the second difference exceeds the modified first difference.

7. The HVAC system of claim 4, wherein the controller is configured to:
    predict the first enthalpy based on a first humidity ratio in which the discharge air is equal to a humidity ratio of the return air; and
    predict the second enthalpy based on a second humidity ratio in which the discharge air is equal to the humidity ratio of the outdoor air.

8. A method of operating a heating, ventilation, or air conditioning (HVAC) system for a building, the method comprising:
  receiving return air from within a building via a first air intake and outdoor air from outside the building via a second air intake;
  measuring temperature and humidity of the return air and the outdoor air using a plurality of sensors;
  identifying a dry coil condition, wherein identifying the dry coil condition comprises:
    calculating a temperature dewpoint of the return air based on the measured temperature and humidity of the return air;
    comparing the temperature dewpoint of the return air with a temperature setpoint for discharge air; and
  identifying the dry coil condition in response to the temperature dewpoint being below the temperature setpoint;
  calculating an enthalpy of the return air based on the measured temperature and humidity of the return air;
  calculating an enthalpy of the outdoor air based on the measured temperature and humidity of the outdoor air;
  selecting either a normal cooling mode or free cooling mode based on the calculated enthalpy of the return air, the calculated enthalpy of the outdoor air, and whether a coil condition is the dry coil condition; and
  operating the HVAC system to provide the outdoor air to the building as the discharge air in response to selecting the free cooling mode.

9. The method of claim 8, wherein identifying a wet coil condition comprises:
  identifying the wet coil condition in response to the temperature dewpoint exceeding the temperature setpoint; and
  wherein the normal cooling mode or free cooling mode based on the calculated enthalpy of the return air, the calculated enthalpy of the outdoor air, and whether the coil condition is the wet coil condition or the dry coil condition.

10. The method of claim 9, wherein in response to identifying the wet coil condition, selecting either the normal cooling mode or the free cooling mode comprises:
  comparing the enthalpy of the return air with the enthalpy of the outdoor air;
  selecting the free cooling mode in response to the enthalpy of the return air exceeding the enthalpy of the outdoor air; and
  selecting the normal cooling mode in response to the enthalpy of the return air not exceeding the enthalpy of the outdoor air.

11. The method of claim 10, wherein in response to identifying the dry coil condition, selecting either the normal cooling mode or the free cooling mode comprises:
  predicting a first enthalpy of the discharge air under a first scenario in which the HVAC system is operated in the normal cooling mode;
  calculating a first difference between the first enthalpy of the discharge air and the enthalpy of the return air;
  predicting a second enthalpy of the discharge air under a second scenario in which the HVAC system operated in the free cooling mode;
  calculating a second difference between the second enthalpy of the discharge air and the enthalpy of the outdoor air; and
  selecting either the normal cooling mode or the free cooling mode based on the first difference and the second difference.

12. The method of claim 11, wherein the method further comprises:
  selecting the free cooling mode if the first difference exceeds the second difference; and
  selecting the normal cooling mode if the first difference does not exceed the second difference.

13. The method of claim 11, further comprising:
  calculating a modified first difference by modifying the first difference to account for sensor error;
  comparing the modified first difference to the second difference; and
  selecting either the normal cooling mode or the free cooling mode based on whether the second difference exceeds the modified first difference.

14. A method for operating a heating, ventilation, or air conditioning (HVAC) system for a building, the method comprising:
  receiving return air from within a building via a first air intake and outdoor air from outside the building via a second air intake;
  measuring temperature and humidity of the return air and the outdoor air using a plurality of sensors;
  identifying a wet coil condition or a dry coil condition;
  calculating an enthalpy of the return air based on the measured temperature and humidity of the return air;
  calculating an enthalpy of the outdoor air based on the measured temperature and humidity of the outdoor air;
  selecting either a normal cooling mode or free cooling mode based on the calculated enthalpy of the return air, the calculated enthalpy of the outdoor air, and whether a coil condition is the wet coil condition or the dry coil condition;
  operating the HVAC system to provide the outdoor air to the building as discharge air in response to selecting the free cooling mode:
    predicting first enthalpy based on a first humidity ratio in which the discharge air is equal to a humidity ratio of the return air; and
    predicting second enthalpy based on a second humidity ratio in which the discharge air is equal to the humidity ratio of the outdoor air.

15. A controller for a building heating, ventilation, or air conditioning (HVAC) system, the controller comprising:
  one or more processors; and
  one or more non-transitory computer-readable media storing instructions that, when executed by the one or more processors, cause the one or more processors to perform operations comprising:
  identify a wet coil condition or a dry coil condition in response to a temperature dewpoint of return air exceeding a temperature setpoint; and
  identifying the dry coil condition in response to the temperature dewpoint not exceeding the temperature setpoint;
  calculate an enthalpy of the return air received from a building space based on a measured temperature and humidity of the return air;
  calculate an enthalpy of outdoor air based on a measured temperature and humidity of the outdoor air;
  select either a normal cooling mode or free cooling mode based on the calculated enthalpy of the return air, the calculated enthalpy of the outdoor air, and the identification of the wet coil condition or the dry coil condition;
  operate equipment of the HVAC system to provide the return air to the building as discharge air in response to selecting the normal cooling mode; and operate the equipment of the HVAC system to provide the outdoor air to the building as the discharge air in response to selecting the free cooling mode.

16. The controller of claim 15, wherein identifying the wet coil condition or the dry coil condition comprises:
   calculating the temperature dewpoint of the return air based on the measured temperature and humidity of the return air; and
   comparing the temperature dewpoint of the return air with a temperature setpoint for the discharge air.

17. The controller of claim 16, wherein in response to identifying the wet coil condition, selecting either the normal cooling mode or the free cooling mode comprises:
   comparing the enthalpy of the return air with the enthalpy of the outdoor air;
   selecting the free cooling mode in response to the enthalpy of the return air exceeding the enthalpy of the outdoor air; and
   selecting the normal cooling mode in response to the enthalpy of the return air not exceeding the enthalpy of the outdoor air.

18. The controller of claim 16, wherein in response to identifying the dry coil condition, selecting either the normal cooling mode or the free cooling mode comprises:
   predicting a first enthalpy of the discharge air under a first scenario in which the HVAC system is operated in the normal cooling mode;
   calculating a first difference between the first enthalpy of the discharge air and the enthalpy of the return air;
   predicting a second enthalpy of the discharge air under a second scenario in which the HVAC system is operated in the free cooling mode;
   calculating a second difference between the second enthalpy of the discharge air and the enthalpy of the outdoor air; and
   selecting either the normal cooling mode or the free cooling mode based on the first difference and the second difference.

19. The controller of claim 18, wherein the controller is configured to:
   select the free cooling mode if the first difference exceeds the second difference; and
   select the normal cooling mode if the first difference does not exceed the second difference.

20. The controller of claim 18, wherein the controller is further configured to:
   calculate a modified first difference by modifying the first difference to account for sensor error;
   compare the modified first difference to the second difference; and
   select either the normal cooling mode or the free cooling mode based on whether the second difference exceeds the modified first difference.

* * * * *